UNITED STATES PATENT OFFICE.

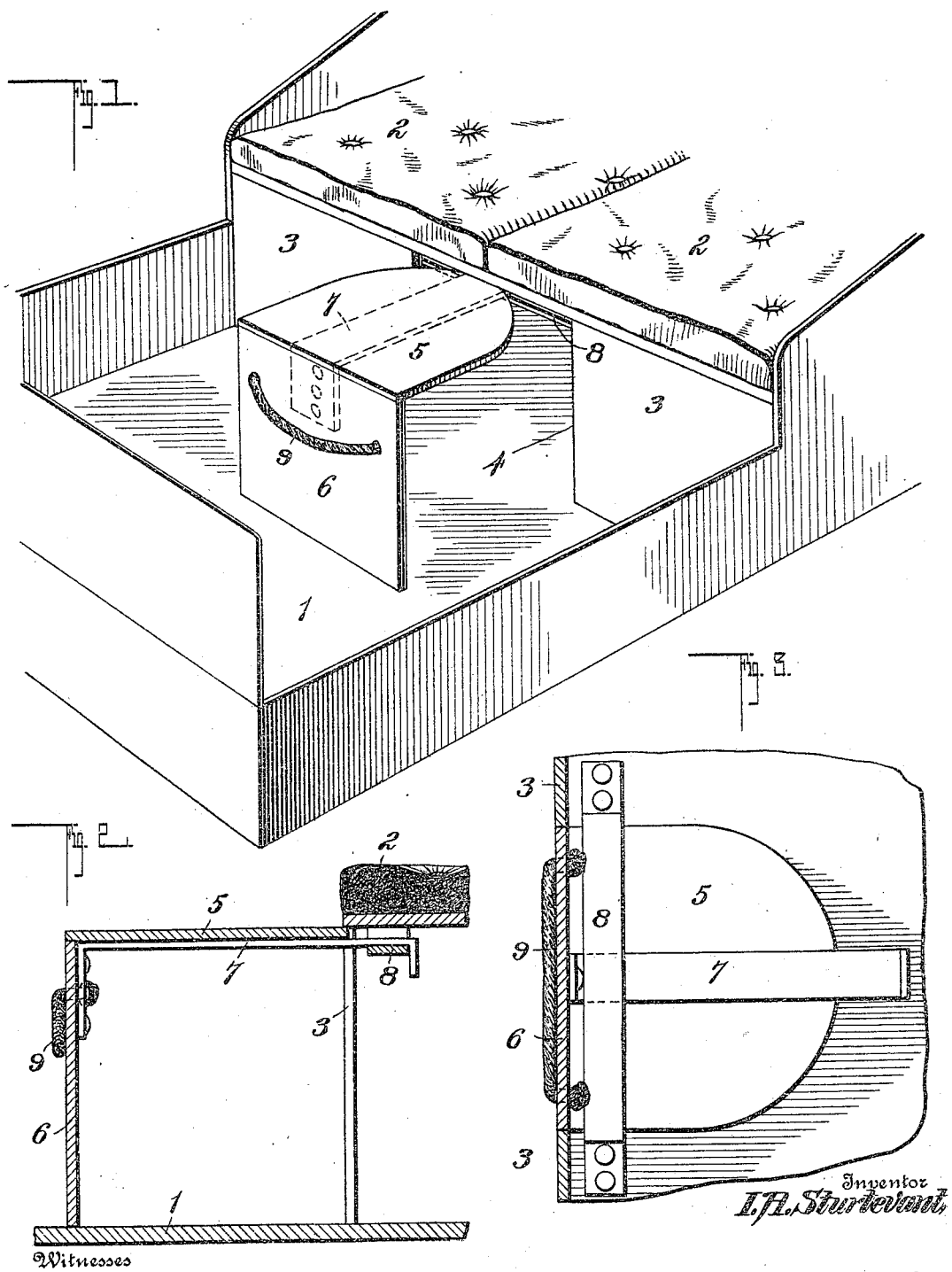

ISABELLE A. STURTEVANT, OF CENTER HARBOR, NEW HAMPSHIRE.

EXTENSION-SEAT FOR CARRIAGES.

950,195.

Specification of Letters Patent. Patented Feb. 22, 1910.

Application filed July 15, 1909. Serial No. 507,805.

*To all whom it may concern:*

Be it known that I, ISABELLE A. STURTEVANT, a citizen of the United States, residing at Center Harbor, in the county of Belknap and State of New Hampshire, have invented a new and useful Improvement in Extension-Seats for Carriages, of which the following is a specification.

This invention relates to extension seats for carriages and buggies, or other road vehicles, the object being to provide an additional seat which when not in use slides beneath one of the regular seats of the vehicle, and when in use is drawn outwardly thus forming a supplemental seat in advance of the central portion of the regular seat, and but slightly lower.

A seat of this kind is especially adapted for use in connection with single seated buggies built for two persons and avoid the necessity of crowding a child into the seat between the other two occupants.

The invention consists of the novel features of construction hereinafter fully described, pointed out in the claim and shown in the accompanying drawings, in which, Figure 1 is a perspective view showing my extension seat in position for use. Fig. 2 is a vertical section showing the seat drawn outwardly. Fig. 3 is an inverted plan view, the front vertical panel of the seat being in section.

In these drawings, 1 represents the body of a buggy, 2 the regular seat, and 3 the front panel which may be either of a rigid material, such as veneered wood to match the body 1, or this panel may be of leather to match the usual seat cushions. This panel instead of extending entirely across the body as at present is centrally cut out as shown at 4 and in this cut out portion slides my extension seat 5 the front edge of which is supported by a vertical panel 6 the outer face of which will in color or finish match the cut out panel 3. The seat 5 is connected to an angled bar 7 which works through a bracket 8 carried by the underside of the seat 2, the angled rear end of the bar 7 serving as a stop and limiting outward movement of the seat. The seat is also provided with a suitable cord 9 of any kind which is carried by the supporting panel 6 and by means of which the seat can be readily drawn outwardly, the lower edge of the panel 6 sliding upon the bottom of the body 1. When the seat is closed the panel 6 fits in the cut out portion 4 thus entirely hiding the seat 5 and leaving the buggy to all appearances similar to those not provided with an extension seat of this kind.

What I claim is:—

The combination with a vehicle seat having a front vertical panel centrally cut out, a bracket carried by the underside of the seat in alinement with the cut out portion of the panel, a bar sliding in said bracket, an extension seat carried by said bar and a front supporting panel carried by the front edge of said seat, the supporting panel resting upon and sliding on the vehicle bottom and filling the cut out portion of the first mentioned panel when the extension seat is in its closed position.

ISABELLE A. STURTEVANT.

Witnesses:
 AMY M. PORTER,
 BERTRAM BLAISDELL.